March 4, 1952     F. M. ZURAS     2,588,191
CONTROL UNIT FOR VISUAL TRAINING DEVICES
Filed June 9, 1949     3 Sheets-Sheet 1
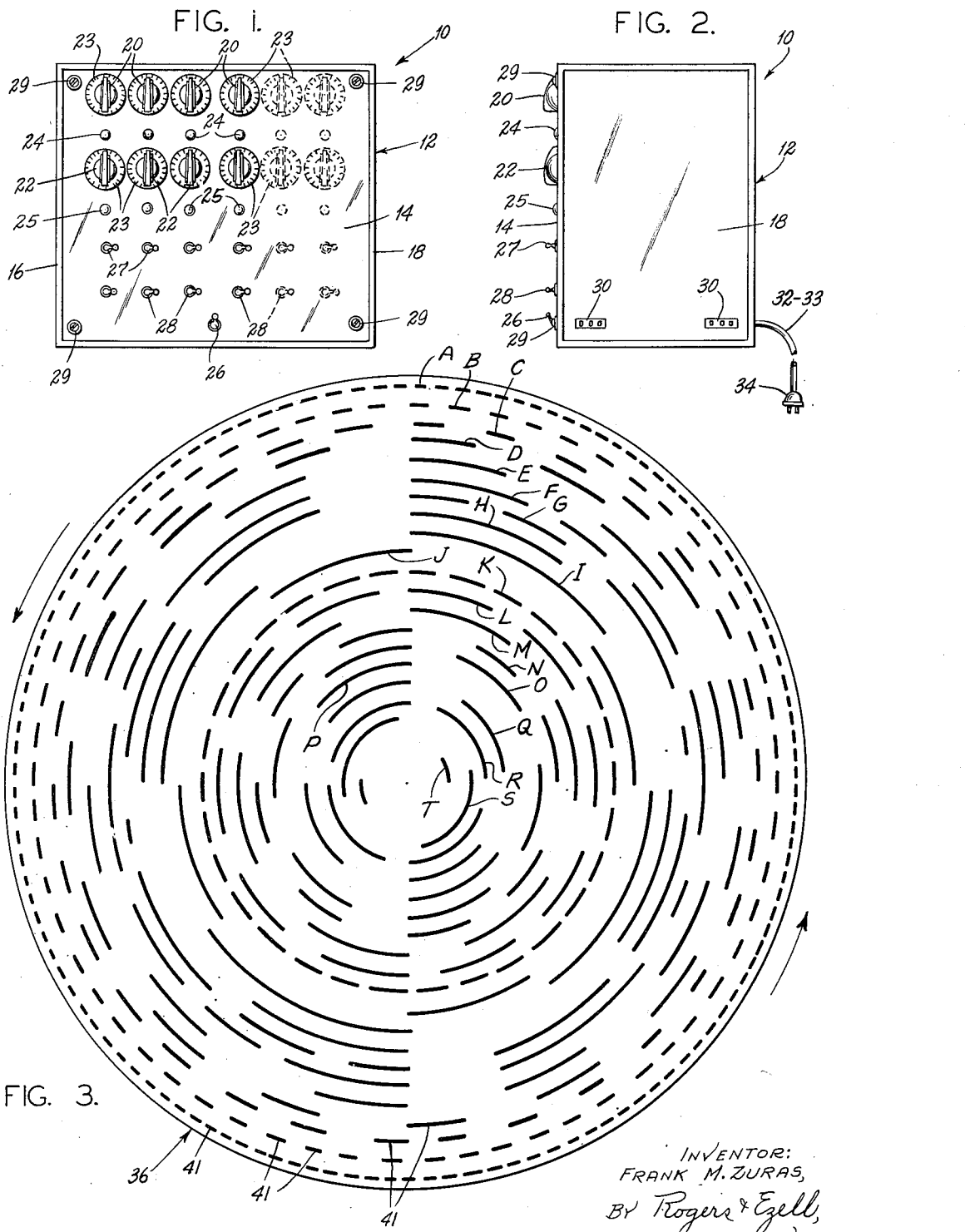
INVENTOR:
FRANK M. ZURAS,
BY Rogers & Ezell,
ATTORNEYS.

March 4, 1952 F. M. ZURAS 2,588,191
CONTROL UNIT FOR VISUAL TRAINING DEVICES
Filed June 9, 1949 3 Sheets-Sheet 2
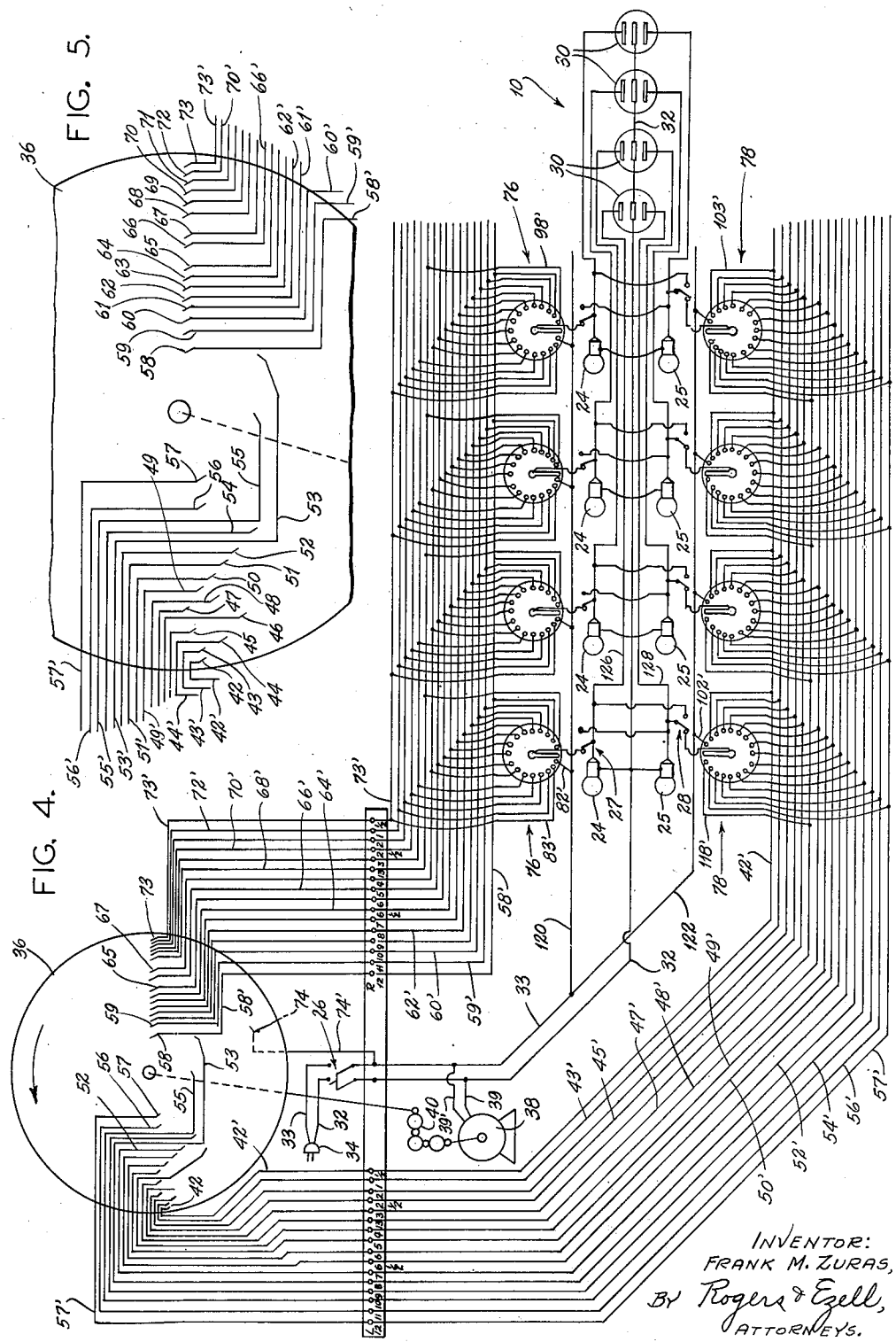
INVENTOR:
FRANK M. ZURAS,
BY Rogers & Ezell,
ATTORNEYS.

March 4, 1952  F. M. ZURAS  2,588,191
CONTROL UNIT FOR VISUAL TRAINING DEVICES
Filed June 9, 1949  3 Sheets—Sheet 3
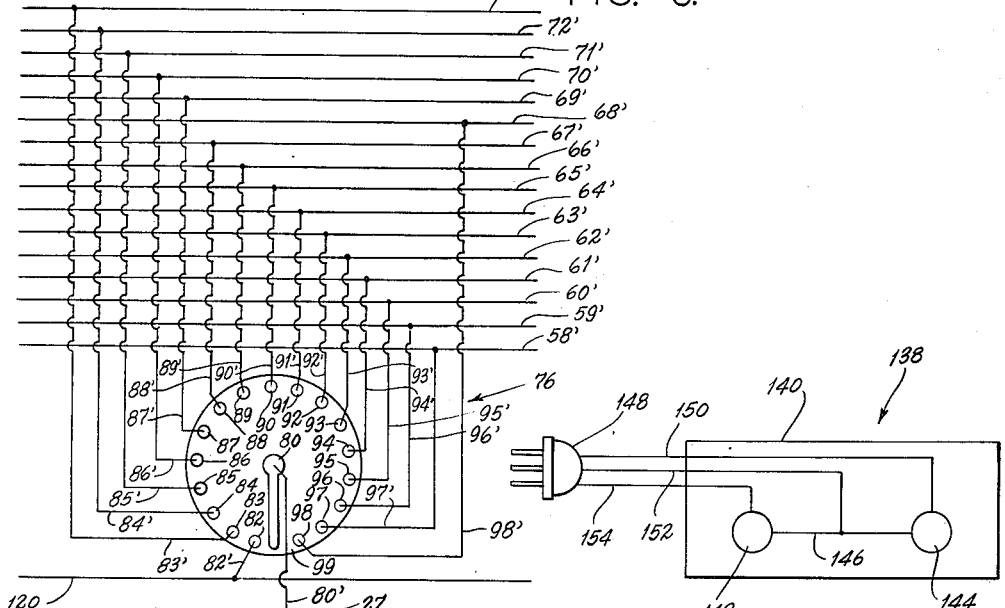
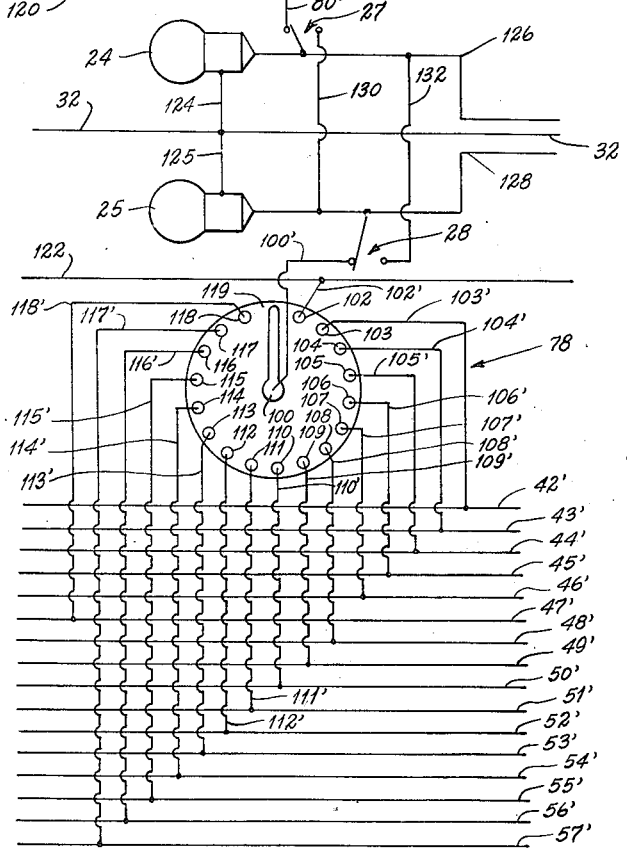
INVENTOR:
FRANK M. ZURAS,
BY Rogers & Ezell,
ATTORNEYS.

Patented Mar. 4, 1952

2,588,191

UNITED STATES PATENT OFFICE 2,588,191

CONTROL UNIT FOR VISUAL TRAINING DEVICES

Frank M. Zuras, St. Louis, Mo.

Application June 9, 1949, Serial No. 98,041

18 Claims. (Cl. 128—76.5)

1

The present invention relates generally to the ocular orthopedic art, and more particularly to a novel electrical control unit for use with visual training devices.

The control unit is used for controlling a single training device or a plurality of training devices, whereby the light sources or the like in each device can be selectively energized in sequence or in unison for selected periods of time by merely rotating control switches which complete the electrical circuit between each light source and a rotatable member mounted within the unit. The rotatable member contains a plurality of spaced conductors positioned in continuous paths, there being at least one brush adjacent each path of conductors so as to contact the latter, thereby causing a continuous energization or a controlled intermittent energization of the light sources.

As is well known in the art, many visual problems such as suppression, squints, amblyopia, minus projection, myoptic reduction, etc., can be corrected or greatly improved by visual training.

One type of device for training a patient's eyes consists primarily of an elongated view box which contains a pair of horizontally disposed light sources at one end thereof, the energization of the light sources being controlled by means of an interconnected control unit, whereby the light sources are energized individually or simultaneously for predetermined periods of time and in a predetermined sequence.

To take a very simple example for purposes of illustration, a patient can be caused to move his eyes back and forth in a horizontal direction by employing a screen within the view box which contains a pair of horizontally disposed arrows with the arrowheads pointing outwardly and a dot adjacent each arrow point, one light source being positioned to illuminate each arrow. Thus, by alternately illuminating the arrows at, for example, one-half second intervals, the patient can be taught to move his eyes back and forth from one dot to the other, so as to attain quick accurate fixations.

There are several types of known control units in use at the present time, but they are not completely satisfactory in that they require a considerable expenditure of time and energy each time the energization sequence or period of energization is changed.

2

It is an object of the present invention, therefore, to provide a novel control unit for use with a visual training device containing at least a pair of light sources, whereby the sequence of energization and the length of the periods of energization of the light sources can be changed quickly and easily.

Another object is to provide a novel control unit for use with a plurality of visual training devices, each containing at least a pair of light sources or the like, whereby each device can be separately controlled and the light sources therein energized in selected sequence or in unison for selected periods of time.

Another object is to provide a control unit for use with a plurality of visual training devices which may be in positions remote from the control unit, each device containing at least a pair of light sources, whereby there is a visual indication at the control unit when the light sources are energized.

Another object is to provide a control unit for use with a plurality of visual training devices, each containing at least a pair of light sources, whereby each light source in a device can be selectively controlled by a separate switch so that they are energized in a predetermined sequence, or whereby both light sources can be controlled from a single switch, so that they are energized in unison.

Further objects and advantages of the present invention will be apparent from the following description, reference being had to the accompanying drawings wherein a preferred embodiment of the present invention is shown, in which.

Fig. 1 is a front elevational view of a control unit constructed in accordance with the teachings of the present invention;

Fig. 2 is a side elevational view of the control unit, taken from the right of Fig. 1;

Fig. 3 is a top plan view of the control disc;

Fig. 4 is a wiring diagram of the control unit;

Fig. 5 is a view of a portion of the control disc of Fig. 4, on an enlarged scale;

Fig. 6 is an enlarged fragmentary wiring diagram of a pair of selector switches and signal lamps; and Fig. 7 is a wiring diagram of one form of training device.

Referring to the drawings more particularly by reference numerals, 10 indicates generally a control unit embodying the teachings of the present invention, which includes a rectangular shaped container 12 having a front panel 14 and side panels 16 and 18.

The front panel 14 contains a series of upper and lower, spaced control knobs 20 and 22, each of which has an annular, ruled indicator 23 positioned about it, as shown in Fig. 1. Small indicator lamps 24 and 25 are mounted below the control knobs 20 and 22, respectively. A toggle switch 26 is mounted adjacent the lower edge of the front panel 14 and two sets of spaced toggle switches 27 and 28 are positioned below the indicator lamps 25.

The front panel 14 is removably secured in position by means of screws 29.

Three-pronged, jack receptacles 30 are contained in the lower portion of the side panels 16 and 18, there being two on each side in the present illustration, but any number can be employed as will be more fully described hereinafter.

A two-wire power lead 32—33 extends from the rear of the container 10 and contains a two-pronged plug 34 on the end thereof.

A control disc 36 (Figs. 3–5) of insulation material is rotatably mounted within the container 12 and is driven at a constant speed by an electric motor 38 through a gear train 40. The disc 36 contains a series of arcuate conductor bars 41 mounted on one side thereof, each of the conductor bars being individually connected to a common ring (not shown) on the other side of the disc. As shown in Fig. 3, the conductor bars 41 are disposed about concentric circles A through T, inclusive, the center of each of which coincides with the center of the disc 36. The number of the conductor bars 41 in each circle and the spaces between them are dependent upon the flash pattern the operator is desirous of obtaining, as will be more fully described hereinafter.

Contact brushes 42 to 73, inclusive, are positioned within the container 12 adjacent the conductor bars 41 in the circles A through T, as indicated in the following table, the brushes being positioned to make intermittent contact with the individual conductor bars 41 as the latter pass them:

| Circle | Brushes | Circle | Brushes |
|--------|---------|--------|---------|
| A | 42, 73 | K | 50, 65 |
| B | 43, 72 | L | 51, 64 |
| C | 44, 71 | M | 52, 63 |
| D | 45, 70 | N | 53, 62 |
| E | 46, 69 | O | 54, 61 |
| F | 68 | P | 55, 60 |
| G | 47 | Q | 59 |
| H | 48, 67 | R | 56 |
| I | 66 | S | 58 |
| J | 49 | T | 57 |

The brush 74 is continuously in contact with the ring (not shown) on the reverse side of the disc 36.

Leads 42' to 74', inclusive, are connected to the brushes 42 to 74, respectively.

A plurality of selector switches 76 and 78, shown schematically in Figs. 4 and 6, are mounted on the rear surface of the front panel 14 and are connected with the control knobs 20 and 22, respectively, so as to be actuated by the latter when they are rotated. Inasmuch as all of the selector switches are structurally the same and the switches 76 are connected in parallel, and the switches 78 are also connected in parallel, only one of each of the switches and the electrical connections thereto will be described in detail.

As shown in Fig. 6, each selector switch 76 includes a rotatable contact arm 80, seventeen spaced contact buttons 82 through 98, and a neutral point 99.

A lead 80' is connected to the contact arm 80 and leads 82' to 98', inclusive, are connected to the contact buttons 82 through 98, respectively.

Each selector switch 78 includes a rotatable contact arm 100, seventeen spaced contact buttons 102 through 118, and a neutral point 119.

A lead 100' is connected to the contact arm 100 and leads 102' to 118', inclusive, are connected to the contact buttons 102 through 118, respectively.

As shown in Fig. 4, the power leads 32 and 33 pass through the toggle switch 26. The motor 38 is connected to the leads 32 and 33 by leads 39 and 39', respectively. Leads 120 and 122 are connected to the end of the lead 33 and pass adjacent the control switches 76 and 78, respectively. A lead 82' is connected between contact button 82 and lead 120, and a lead 102' is connected between contact button 102 and lead 122. The lead 32 is connected to the center contact of all of the receptacles 30.

As shown in Fig. 6, one side of the signal lamps 24 and 25 are connected to lead 32 through leads 124 and 125, respectively. The other side of the lamps are connected to the top and bottom contacts, respectively, of the first receptacle 30 (Fig. 4) through leads 126 and 128, respectively.

The contact arm of the toggle switch 27 is connected to lead 126, and one pole of the switch is connected to the lead 80' and the other pole is connected to the lead 128 through a lead 130.

The contact arm of the toggle switch 28 is connected to lead 128, and one pole of the switch is connected to the lead 100' and the other pole is connected to the lead 126 through a lead 132.

As shown in Fig. 4, the leads from the brushes are connected to leads from the contact buttons, as indicated in the following list:

| Brush Lead | Contact Button Lead | Brush Lead | Contact Button Lead |
|------------|---------------------|------------|---------------------|
| 42' | 103' | 58' | 97' |
| 43' | 104' | 59' | 96' |
| 44' | 105' | 60' | 95' |
| 45' | 106' | 61' | 94' |
| 46' | 107' | 62' | 93' |
| 47' | 118' | 63' | 92' |
| 48' | 108' | 64' | 91' |
| 49' | 109' | 65' | 90' |
| 50' | 110' | 66' | 89' |
| 51' | 111' | 67' | 88' |
| 52' | 112' | 68' | 98' |
| 53' | 113' | 69' | 87' |
| 54' | 114' | 70' | 86' |
| 55' | 115' | 71' | 85' |
| 56' | 116' | 72' | 84' |
| 57' | 117' | 73' | 83' |

One type of visual training device 138 is shown diagrammatically in Fig. 7, and includes an enclosure 140 containing a pair of lamps 142 and 144. A lead 146 is connected between the two lamps, and a three-pole plug 148 is electrically connected to the lamps through leads 150, 152 and 154.

Operation

As previously stated, one or more visual training devices 138 can be used with a single control unit 10, the number being limited only by the number of groups of control switches 76 and 78, and the number of receptacles 30.

To use the unit, the plug 34 is inserted in a regular power outlet, and the toggle switch 26 turned on, thereby causing the motor 38 to become energized and drive the disc 36 through the gear train 40. In the device illustrated, the disc turns one revolution per minute, but it is to be understood that practically any speed can be used if the number and length of the contact bars 41 are changed accordingly.

After the unit 10 is energized, the training device plug 148 is inserted in the first receptacle 30 (Fig. 4) which is associated with the first set of control switches 76 and 78.

Assuming that the operator wishes to cause the training device lamps 142 and 144 to blink alternately at ¼ second intervals, he would turn the control switch arm 80 from its neutral position 99 to contact button 83, and the arm 100 to contact button 103. The handle of the switch 27 would then be moved to the left so that its switch arm is connected with lead 80', and the handle of the switch 28 moved to the left so that its arm is connected with lead 100', thereby completing the electrical circuit. Therefore, when brush 73 comes in contact with a conductor bar in circle A, one circuit is from one side of the power source through lead 33, switch 26, lead 74', brush 74, the ring (not shown) on the reverse side of the disc 36, the conductor bar A, brush 73, lead 73', lead 83', switch arm 80, lead 80', switch 27, lead 126, the top terminal of plug 148, lead 150, lamp 144, lead 146, lead 152, the middle terminal of plug 148, lead 32, and back to the other side of the power source through switch 26.

In order to indicate that lamp 144 is energized, the signal lamp 24 is also energized at the same time through a parallel circuit. This circuit is from one side of the power source through lead 33, switch 26, lead 74', brush 74, the ring (not shown), conductor bar A, brush 73, lead 73', lead 83', switch arm 80, lead 126, lamp 24, lead 124, lead 32, and back to the other side of the power source through switch 26.

Because the disc 36 rotates at one revolution per minute and there are one hundred and twenty bars in circle A, and there are spaces between the bars equal to the length of the bars, the brush 73 will be alternately in contact with a bar for ¼ second, and then out of contact with a bar for ¼ second, consequently the lamps 24 and 144 will blink at ¼ second intervals.

The brush 42, which is almost diametrically opposite from the brush 73, is offset from the diametrical line so that, when the brush 73 is in contact with the conductor bar, the brush 42 is not, and vice versa. Therefore, when the lamp 144 is not energized, the lamp 142 is energized. This circuit through the lamp 142 is made from one side of the power source through lead 33, switch 26, lead 74', brush 74, the ring (not shown), the conductor bar in circle A, brush 42, lead 42', lead 103', contact button 103, switch arm 100, lead 100', switch 28, lead 128, the bottom terminal of plug 148, lead 154, lamp 142, lead 146, lead 152, the middle terminal of plug 148, lead 32, and back to the other side of the power source through the switch 26.

At the same time that the circuit is made through the lamp 142, another circuit is made through the signal lamp 25. This latter circuit is from one side of the power source through lead 33, switch 26, lead 74', brush 74, the ring (not shown), the conductor bar in circle A, brush 42, lead 42', lead 103', contact button 103, switch arm 100, lead 100', switch 28, lead 128, lamp 25, lead 125, lead 32, and back to the other side of the power source through switch 26.

Thus, when the switch arms 80 and 100 are in the positions indicated, the lamps 142 and 144 will be alternately energized at ¼ second intervals so that, if a patient were viewing them through a screen which contained horizontally disposed arrows as described above, he would tend to move his eyes back and forth so as to perform a simple exercise.

If, however, the operator desires to have the lamps 142 and 144 energized for different lengths of time, as for example the lamp 142 to be alternately energized for fifteen seconds and then off for fifteen seconds, and the lamp 144 to be energized for five seconds and off for twenty-five seconds, he would rotate the control switch arm 80 to button number 97 and the control switch arm 100 to button 117. With the switch arms in the positions indicated, the circuit to the lamps 142 and 144 are made through the conductor bars in circles T and S, respectively. Thus, with the disc in the position shown in Fig. 3, brush 58 would be just leaving a conductor bar in circle T, and brush 57 would be starting to contact a conductor bar in circle S. Consequently, the illumination cycle would be: 142 on for fifteen seconds (144 off); both off for ten seconds; 144 on for five seconds (142 off); 142 on for fifteen seconds (144 off); both off for ten seconds; 144 on for five seconds (142 off).

If the operator desires to have both lamps blink in unison on either the five-second on, twenty-five-second off cycle of circle T, or the fifteen-second on, fifteen-second off cycle of circle S, this can be accomplished by changing the position of either the switch 28 or 27, respectively. Thus, if switch 28 were to be changed so that the arm contacted the end of lead 132, the circuit through lamp 142 would be from one side of the power source through lead 33, switch 26, lead 74', brush 74, the ring (not shown), brush 58, lead 58', lead 97', contact button 97, arm 80, lead 80', lead 126, lead 132, switch 28, lead 128, the lower terminal of receptacle 30 and plug 148, lead 154, lamp 142, lead 146, lead 152, the middle terminal of plug 148 in receptacle 30, lead 32, switch 26, lead 32 and back to the other side of the power source.

If the operator desires to have either lamp 144 or 142 burn continuously, this can be accomplished by rotating the arm 80 to the contact button 82, or by rotating the arm 100 to the contact button 102. Thus, if the arm 80 is rotated to the contact button 82, the circuit will be from one side of the power source through lead 33 and switch 26, lead 120, lead 82', arm 80, lead 80', lead 126, the top terminal of plug 148, lead 150, lamp 144, lead 146, lead 152, the middle terminal of plug 148, lead 32, switch 26, and back to the other side of the power source.

Thus it is apparent that by merely rotating the control switches 20 and 22, and by moving the toggle switches 27 and 28 from one side to the other, the operator can cause the lamps 142 and 144 in the training device 138 to be energized alternately or in unison for predetermined periods of time and in a predetermined sequence. Manifestly these changes can be accomplished in a matter of seconds, so that there is thus provided a very flexible control unit.

It is to be understood that the foregoing description and the accompanying drawings have been given only by way of illustration and example, and that changes and alterations in the present disclosure, which will be readily apparent to one skilled in the art, are contemplated as within the scope of the present invention which is limited only by the claims which follow.

What is claimed is:

1. A control unit for use with visual training devices, containing at least one light source, comprising a rotatable member containing a plurality of spaced conductors positioned in predetermined paths; means for rotating said member; a plurality of contact means fixedly positioned adjacent the paths to intermittently contact the conductors; and switch means for selectively connecting the light source with any of the contact means.

2. A control unit for use with visual training devices containing at least one light source, comprising a member containing a plurality of spaced conductors positioned in spaced paths, each of said conductors being insulated from the member and connected to a common contact point; at least one contact means adjacent each path, there being relative movement between the member and the contact means whereby the latter intermittently contact the conductors; and switch means for selectively connecting the light source with any one of the contact means.

3. A control unit for use with visual training devices containing at least one light source, comprising a rotatable disc-like member containing a plurality of spaced conductors grouped in concentric circles, each conductor being insulated from the disc-like member and electrically connected to a common contact point; means for rotating said member; at least one brush adjacent each circle of conductors to intermittently contact the conductors in said circle, and switch means for selectively connecting the light source with any one of the brushes.

4. A control unit for use with visual training devices containing at least one light source, comprising a rotatable member containing a plurality of spaced conductors positioned in predetermined paths; means for rotating said member, a plurality of contact means fixedly positioned adjacent the paths to intermittently contact the conductors; switch means for selectively connecting the light source with one of the contact means; and visual means separate from the light source for indicating that the light source is connected with a contact means.

5. A control unit for use with a visual training device containing at least two light sources, comprising a casing; and means for selectively energizing the light sources in a training device in selected sequence or in unison for predetermined periods of time, including a rotatable member containing a plurality of spaced conductors positioned in predetermined paths.

6. A control unit for use with a visual training device containing at least two light sources, comprising a casing; and means for selectively energizing the light sources in a training device in selected sequence or in unison for predetermined periods of time, including a rotatable member containing a plurality of spaced conductors positioned in predetermined paths, and at least a pair of control switches containing a plurality of contacts.

7. A control unit for use with visual training devices containing at least two light sources, comprising a casing; and means for selectively energizing the light sources in a training device in selected sequence or in unison for predetermined periods of time, including a rotatable member containing a plurality of spaced conductors positioned in predetermined paths, and a pair of control switches containing a plurality of contacts; and a pair of visual indicating elements, each element indicating when its corresponding light source is energized.

8. A control unit for use with a plurality of visual training devices each containing at least two light sources, comprising a casing containing a plurality of outlet elements, each outlet element providing the connection between the control unit and a training device; and means for selectively energizing the light sources in each connected exercise device in selected sequence or in unison for predetermined periods of time, including a rotatable member containing a plurality of spaced conductors positioned in predetermined paths and a pair of control switches for each training device.

9. A control unit for use with a plurality of visual training devices each containing at least two light sources, comprising a casing containing a plurality of outlet elements, each outlet element providing the connection between the control unit and a training device; a rotatable member containing a plurality of spaced conductors positioned in predetermined continuous paths; means for rotating said member; a plurality of contact means fixedly positioned adjacent the paths to intermittently contact the conductors; and a pair of control switches for each training device for selectively connecting the light sources with any of the contact means.

10. A control unit for use with a plurality of visual training devices each containing at least two light sources, comprising a casing containing a plurality of outlet elements, each outlet element providing the connection between the control unit and a training device; a rotatable member containing a plurality of spaced conductors positioned in predetermined continuous paths; means for rotating said member; a plurality of contact means fixedly positioned adjacent the paths to intermittently contact the conductors; a pair of control switches for each training device for selectively connecting the light sources with any of the contact means; and a visual indicator for each light source for indicating when the latter are energized.

11. A control unit for use with visual training devices containing two spaced light sources, comprising a casing; means for selectively energizing the light sources in a training device in selected sequence for predetermined periods of time, including a rotatable member containing a plurality of spaced conductors positioned in continuous paths and a pair of control switches for each training device, one switch controlling the energization of one light source and the other controlling the energization of the other light source; and means for simultaneously controlling both light sources with one of said switches.

12. A control unit for use with a plurality of visual training devices each containing at least two light sources, comprising a casing containing a plurality of outlet elements, each outlet element providing the connection between the control unit and a training device, a rotatable disc-like member containing a plurality of spaced conductors grouped in concentric circles, each conductor being insulated from the disc-like member and electrically connected to a common contact point; means for rotating said member at a predetermined constant speed; at least one brush member adjacent each circle of conductors to intermittently contact the conductors in said circle; and switch means for each light source for selectively connecting it with any one of the contact means whereby the light sources in each device are energized in selected sequence or in unison for predetermined periods of time.

13. A control unit for use with a plurality of visual training devices each containing at least two light sources, comprising a casing containing a plurality of outlet elements, each outlet element providing the connection between the control unit and a training device; a rotatable disc-like member containing a plurality of spaced conductors grouped in concentric circles, each conductor being insulated from the disc-like member and electrically connected to a common contact point; means for rotating said member at a predetermined constant speed; at least one brush member adjacent each circle of conductors to intermittently contact the conductors in said circle; switch means for each light source for selectively connecting it with one of the brushes whereby the light sources in each device are energized in selected sequence for predetermined periods of time; and means for controlling both light sources in a training device from a single control switch whereby they are energized in unison.

14. A control unit for use with a plurality of visual training devices each containing at least two light sources, comprising a casing containing a plurality of outlet elements, each outlet element providing the connection between the control unit and a training device; a rotatable disc-like member containing a plurality of spaced conductors grouped in concentric circles, each conductor being insulated from the disc-like member and electrically connected to a common contact point; means for rotating said member at a predetermined constant speed; at least one brush member adjacent each circle of conductors to intermittently contact the conductors in said circle; switch means for each light source for selectively connecting it with one of the brushes whereby the light sources in each device are energized in selected sequence for predetermined periods of time; means for controlling both light sources in a training device from a single switch means; and visual means for indicating when a light source is energized.

15. In combination, a visual training device containing at least two light sources; and means for selectively energizing the light sources in selected sequence for predetermined periods of time or for energizing them in unison for predetermined periods of time including a rotatable member containing a plurality of spaced conductors of various lengths, the conductors being insulated from the member and electrically connected to a common point.

16. In combination, a visual training device containing a least two light sources; and means for selectively energizing the light sources in selected sequence for predetermined periods of time or for energizing them in unison for predetermined periods of time, said last-named means including a switch with a plurality of selectable contacts for each light source.

17. In combination, a visual training device containing at least two light sources; and means for selectively energizing the light sources in selected sequence for predetermined periods of time or for energizing them in unison for predetermined periods of time, said last-named means including a rotatable member containing a plurality of spaced conductors positioned in predeterminated spaced paths, there being a different number of conductors in each path for varying the frequency of energization of the light sources.

18. In combination, a visual training device containing at least two light sources; a member containing a plurality of spaced conductors positioned in predetermined paths; contact means positioned adjacent each path to intermittently contact the conductors in that path; means for causing relative movement between the member and the contact means; and means for selectively connecting the light sources with any of the contact means.

FRANK M. ZURAS.

REFERENCES CITED

The following references are of record in the file of this patent:

UNITED STATES PATENTS

| Number | Name | Date |
|---|---|---|
| 1,276,494 | Craig | Aug. 20, 1918 |
| 1,802,997 | Yetta | Apr. 28, 1931 |
| 1,874,480 | Filene | Aug. 30, 1932 |
| 2,317,197 | Jacobson | Apr. 20, 1943 |